(No Model.)
T. GORDON & W. R. SWIFT.
REGENERATIVE GAS LAMP.
No. 422,588. Patented Mar. 4, 1890.
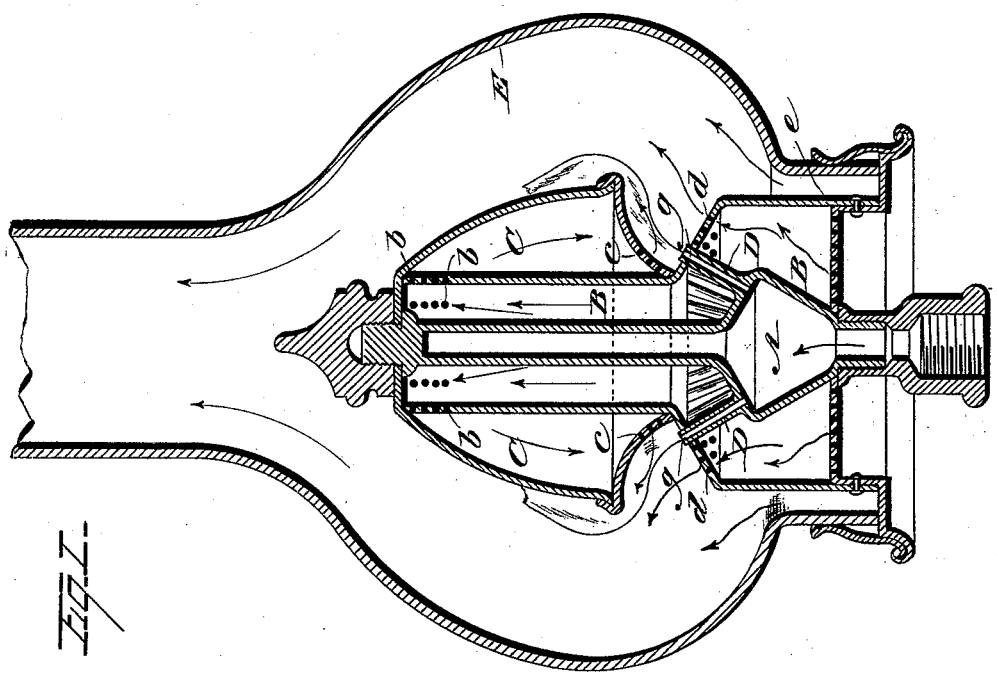
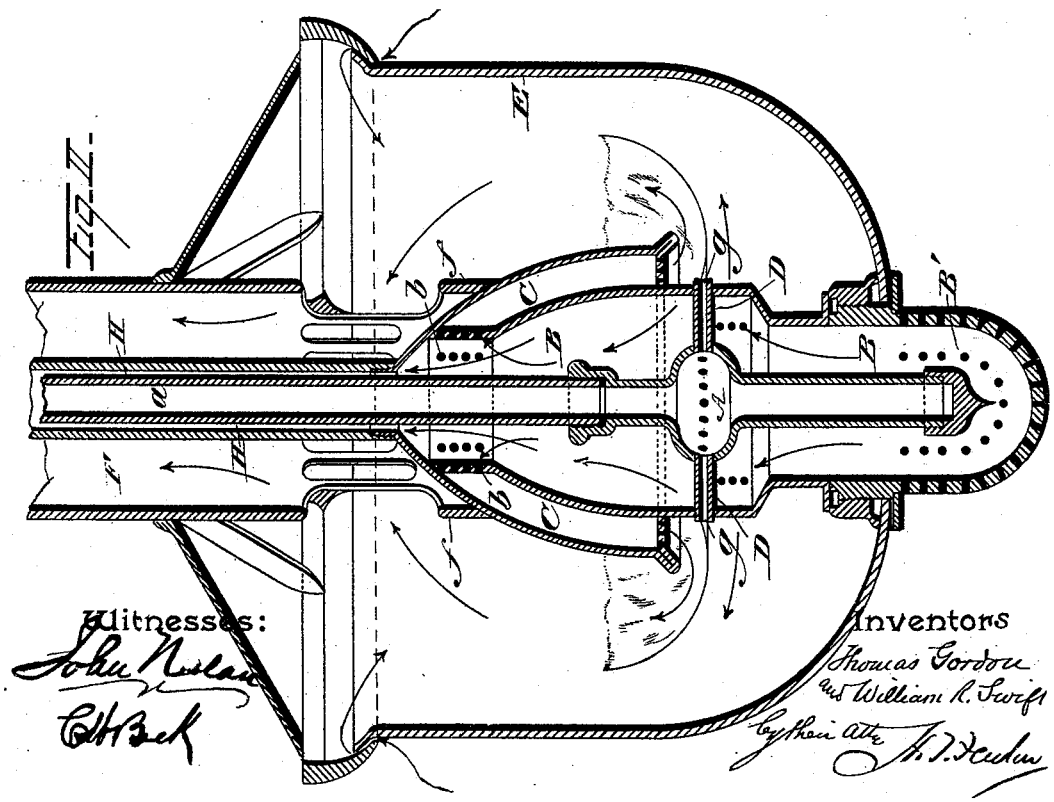

UNITED STATES PATENT OFFICE.

THOMAS GORDON AND WILLIAM R. SWIFT, OF PHILADELPHIA, PENNSYLVANIA.

REGENERATIVE GAS-LAMP.

SPECIFICATION forming part of Letters Patent No. 422,588, dated March 4, 1890.

Application filed December 21, 1888. Serial No. 294,348. (No model.)

*To all whom it may concern:*

Be it known that we, THOMAS GORDON and WILLIAM R. SWIFT, citizens of the United States, residing at Philadelphia, in the State of Pennsylvania, have jointly invented certain new and useful Improvements in Regenerative Gas-Lamps, of which the following is a full, clear, and exact description, reference being had to the accompanying drawings, forming a part of this specification.

Our invention relates to regenerative gas-lamps, and to that class of such lamps in which the supply of air to the flame is admitted to the lamp at the base thereof; and our improvements consist in the division of the air-chamber into two parts, one of which shall be a chamber of high temperature and the other a chamber of low temperature, the same being arranged relatively to each other and to the gas-supply chamber and burner-tubes in such manner that the current of entering fresh air is utilized first to insulate the gas-chamber and its tubes from the heated portion of the lamp, and afterward said air is conveyed to the chamber of high temperature and ejected therefrom into the body of the flame; and our invention further consists in the addition to the foregoing elements making up a regenerative gas-lamp of a third air chamber or conduit surrounding the conduit which conveys gas to the gas-chamber, so arranged as to insulate the same from the escape-flue carrying off the waste products of combustion.

In the accompanying drawings, Figure I is a vertical section through the center of the lamp, illustrating the first part of our invention as set forth in the foregoing statement, and Fig. II is a like vertical section showing slight modification in the arrangement of the burner-tubes, and also the additional element of a third air-chamber or insulating-conduit between the primary gas-conduit and the escape-flue.

Referring to said drawings, B B represent the fresh-air chamber, which we will call the "chamber of low temperature," and it is connected with the base of the lamp, its lower end being covered by a screw-cap containing perforations or inlets and openings through which cool air is admitted to the body of the lamp, and at the top thereof is provided a series of perforations *b b*, opening into a second chamber C, formed by an annular or conical casing entirely surrounding the upper portion of said chamber B, and extending downward so far only as to terminate at a point slightly above the burner-tips, said chamber C being provided with perforations or outlet-openings *c c*, through which the current of air is discharged into the body of the flame. Suspended within the lower part of the chamber B, below the terminal line of the casing C, is a gas-chamber A, having an extended conduit *a* passing through the upper part of the chamber B, and through which gas is supplied to the lamp. It is obvious, however, that the conduit *a* may pass downward instead of upward in the chamber B, so that gas may be supplied from the bottom of the lamp instead of the top thereof. A series of gas-tubes D D proceed from the gas-chamber A and terminate in burner-tips *g g*, projecting through the sides of the chamber B in such manner that they shall be immediately below the outlet-perforations *c* of the hot-air chamber C. An annular series of outlet-perforations *d* in the chamber B are so located therein that they shall supply a current of fresh air to the lower or exterior side of the flame. An inclosing-globe E, forming a combustion-chamber, is employed as usual, and may be of any desired form, such as those shown in the drawings.

Referring to Fig. 2, it will be seen that H H is an annular chamber surrounding the gas-supply conduit *a* from a point where it emerges through the top of the two air-chambers B and C, and it is formed by a cylindrical extension from the top of either the chambers B or C, and communicating, however, only with the cool-air chamber B. Surrounding the chamber H, formed by this cylindrical extension, is an escape-flue F, supported by standards *f* upon the body of the lamp, and serves to carry off the waste products of combustion. It is to be noted, however, that this construction with a cool-air conduit H is applicable only where the gas-supply conduit A proceeds from the top of the lamp downward.

The operation of our invention is as follows, referring to Fig. 1: Gas enters through the conduit $a$ to the gas-chamber A, and thence through the gas-tubes D, and is ignited at the burner-tips $g$. Fresh air enters through the perforations in the cap B' into the chamber B of low temperature, and impinges directly against the gas-chamber A and its burner-tubes D, and also a large part of the gas-conduit $a$, and this being a constantly-renewed current of comparatively cool air keeps these parts mentioned at such a temperature as will prevent them becoming overheated and the gas-tubes clogged in consequence. This constant current of fresh air finds its way out through the perforations $b\ b$ at the top of the chamber B into the chamber of high temperature C, and such air will there be heated, as is obvious, by its contact with the heated outer walls of the chamber C, against which the flame of the ignited gas and air and the products of combustion therefrom impinge. The current of air thus heated finds its way out through the perforations $c$ at the base of the chamber C, said perforations being, as before remarked, slightly above the line of the burner-tips, and is discharged in consequence of such arrangement of the parts directly into the body of the flame at its initial point. Other perforations $d$, arranged in an annular series below the burner-tips, supply air comparatively cool to the exterior or under part of the flame.

Referring to Fig. 2, a portion of the volume of cool air passing to the top of the cool-air chamber B will pass upward through the extension-chamber H and cool the descending volume of gas passing downward through the conduit $a$, said chamber insulating the gas-conduit $a$ from the escape-flue F, which carries off the products of combustion.

Having thus described our invention, what we claim as new, and desire to secure by Letters Patent, is—

1. A regenerative gas-lamp comprising an air-chamber divided into two communicating parts annularly surrounding each other at the top, the central chamber thereof communicating directly with the open air, a gas-magazine wholly inclosed within the said central air-chamber and having an annular series of gas-tubes projecting therefrom through the sides of said chamber, and communicating with a series of burner-tips forming an annular burner arranged below air-eduction apertures in the base of said outer air-chamber, said parts being constructed, combined, and arranged relatively to each other as and for the purpose set forth.

2. A regenerative gas-lamp comprising in combination a combustion-chamber, a central air-chamber extending downward through the same to the base of the lamp and communicating thereat directly with the open air, a gas-chamber inclosed wholly within said air-chamber and having an annular series of gas-tubes projecting therefrom through the sides of said air-chamber, a second air-chamber communicating with the first at the top and annularly surrounding the same to a point slightly above the annular series of burner-tips, and provided with apertures at its base to discharge air to the inner surface of the flame, substantially as described.

3. A regenerative gas-lamp comprising in combination a combustion-chamber, a central air-chamber extending downward through the same to the base of the lamp and communicating thereat directly with the open air, a gas-chamber inclosed wholly within said air-chamber and having an annular series of gas-tubes projecting therefrom through the sides of said chamber, a second air-chamber communicating with the first at the top and annularly surrounding the same to a point slightly above the annular series of burner-tips and provided with apertures at its base to discharge air to the inner surface of the flame, and said central air-chamber being also provided with an annular series of apertures arranged immediately below the annular series of burner-tubes to discharge air to the under surface of the flame, substantially as described.

4. A gas-lamp comprising a central gas-conduit leading from the base of the lamp to a central gas-chamber, tubes which project therefrom through an air-chamber and convey gas in the gas-chamber to the flame, an air-chamber communicating at its base directly with the open air and wholly inclosing said gas-chamber and its tubes, and through which air of low temperature may pass to a communicating air-heating chamber surrounding the first and located above the burner-tips and above or within the flame, and having passages through which air may flow to the upper or interior surface of the flame, and an inclosing-globe, substantially as described.

5. A regenerative gas-lamp comprising a central gas-magazine A, a series of burner-tubes D, projecting therefrom through the sides of a surrounding air-chamber forming an annular burner, a primary air-chamber B, communicating at its base with the open air and wholly inclosing said gas-magazine and its tubes, a second air-chamber C, surrounding the first to a point slightly above the annular burner and having air-passages $b$ at its top communicating with said primary air-chamber, and other air-passages $c$ at its base, and an inclosing-globe, said parts being constructed, combined, and arranged relatively to each other substantially as and for the purpose described.

6. A gas-lamp comprising a central gas-conduit $a$, extending downward to the gas-chamber A, gas-tubes D, communicating with the latter, an air-chamber B of low temperature inclosing the same and communicating at the base directly with the open air, an air-heating chamber C, surrounding the chamber B above the burner-tips and having air-passages $b$, receiving air from the chamber B and conveying it as air of high temperature downward to the interior of the flame, an air-chamber H, surrounding the gas-conduit $a$, and opening into the air-chamber B, insulating the said gas-conduit from the escaping products of combustion, said parts being constructed and combined substantially as described.

In testimony whereof we have hereunto affixed our signatures this 8th day of December, A. D. 1888.

THOMAS GORDON.
WILLIAM R. SWIFT.

Witnesses:
GEO. W. PAYNE,
WM. E. CARRINGTON.